(12) United States Patent
Zurmuehlen

(10) Patent No.: US 10,201,773 B2
(45) Date of Patent: Feb. 12, 2019

(54) FILTER RETAINER ARRANGEMENT

(71) Applicant: Robert C. Zurmuehlen, Bloomfield Hills, MI (US)

(72) Inventor: Robert C. Zurmuehlen, Bloomfield Hills, MI (US)

( * ) Notice: Subject to any disclaimer, the term of this patent is extended or adjusted under 35 U.S.C. 154(b) by 44 days.

(21) Appl. No.: 15/355,826

(22) Filed: Nov. 18, 2016

(65) Prior Publication Data

US 2017/0136395 A1    May 18, 2017

Related U.S. Application Data

(60) Provisional application No. 62/256,831, filed on Nov. 18, 2015.

(51) Int. Cl.
*B01D 46/00* (2006.01)
*B01D 46/10* (2006.01)
*B01D 46/52* (2006.01)

(52) U.S. Cl.
CPC ......... *B01D 46/0005* (2013.01); *B01D 46/10* (2013.01); *B01D 46/521* (2013.01); *B01D 2265/06* (2013.01)

(58) Field of Classification Search
CPC .. A01D 46/005; A01D 46/006; A01D 46/008; A01D 46/009; A01D 46/10; A01D 46/521; A01D 2265/00; A01D 2265/02; A01D 2265/04; A01D 2265/05; G03G 21/206
USPC .................................................. 55/495, 497
See application file for complete search history.

(56) References Cited

U.S. PATENT DOCUMENTS

| | | | | |
|---|---|---|---|---|
| 2,754,928 A | * | 7/1956 | Hambrecht | B01D 46/10 55/491 |
| 2,936,854 A | * | 5/1960 | Lucas | B01D 46/10 55/501 |
| 3,418,794 A | * | 12/1968 | Roberts | B01D 46/10 210/495 |
| 3,774,377 A | * | 11/1973 | Bishop | B01D 46/10 55/493 |
| 4,439,219 A | * | 3/1984 | Lambrecht | B01D 46/0005 248/231.21 |
| 4,519,823 A | | 5/1985 | Kinney, Jr. et al. | |
| 4,737,174 A | * | 4/1988 | Pontius | B01D 46/12 55/491 |
| 4,762,053 A | * | 8/1988 | Wolfert | E04D 13/152 454/260 |

(Continued)

*Primary Examiner* — Joshua E Rodden
(74) *Attorney, Agent, or Firm* — John R. Benefiel

(57) ABSTRACT

A retainer arrangement exerts forces on a filter installed in a holder to increase the sealing pressure exerted by the filter against a holder flange on which the filter is seated when installed the arrangement, including a pair of substantially non stretchable but flexible retainer cables, each attached at either end to respective opposite holder sides at points located within the thickness of the air filter and of a length to enable drawing each cable around an outer edge of an air filter case and onto the surface thereof. An elastic stretch cord is connected at either end thereof to respective retainer cable extending over the surface of the filter at an intermediate point along the length thereof. The retainer cables are thereby tensioned and generate a reaction force acting on each filter perimeter edge contacted by a retainer cable, increasing the sealing pressure exerted by the filter on the holder flange on which it is seated.

8 Claims, 3 Drawing Sheets

(56) References Cited

U.S. PATENT DOCUMENTS

| | | | |
|---|---|---|---|
| 5,183,488 A * | 2/1993 | Deering | B01D 46/10 |
| | | | 55/320 |
| 5,230,799 A * | 7/1993 | Willard | B01D 46/16 |
| | | | 210/455 |
| 5,246,579 A | 9/1993 | Probstmeyer | |
| 6,716,267 B2 | 4/2004 | Lawlor, Sr. | |
| 6,918,940 B1 * | 7/2005 | Lackey | B01D 46/0005 |
| | | | 55/385.1 |
| 8,784,528 B2 | 7/2014 | Gorman | |
| 8,979,966 B2 | 3/2015 | Lise | |
| 2004/0154273 A1 * | 8/2004 | Stephan | B01D 46/0005 |
| | | | 55/495 |
| 2004/0172928 A1 | 9/2004 | Kubokawa | |
| 2006/0188366 A1 * | 8/2006 | Sundet | F24F 13/28 |
| | | | 415/121.2 |
| 2006/0201120 A1 * | 9/2006 | Wu | B01D 46/0005 |
| | | | 55/495 |
| 2007/0294988 A1 * | 12/2007 | Miller | B01D 46/0002 |
| | | | 55/495 |
| 2008/0115475 A1 | 5/2008 | Sandberg | |
| 2009/0209190 A1 * | 8/2009 | Gould | B01D 39/1623 |
| | | | 454/158 |
| 2015/0277373 A1 * | 10/2015 | Yamaguchi | B01D 46/0002 |
| | | | 55/495 |

* cited by examiner

FILTER RETAINER ARRANGEMENT

CROSS REFERENCE TO RELATED APPLICATIONS

This application claims the benefit of U.S. provisional patent application No. 62/256,831 filed on Nov. 18, 2015.

BACKGROUND OF THE INVENTION

This invention concerns retainer arrangements for air (or other gas) filters which typically are constructed with a light weight casing made from a material such as thin paperboard or plastic into which is received an air filter element comprised of pleated filter paper or another type of filter element.

The casing includes a self-supporting U-shaped outer border which receives and encloses the outer perimeter of the air filter element.

A filter holder made of sheet metal or other sturdy material is configured to receive the air filter, and is mounted in the installation in which the air filter is to be used. The holder has a wall structure which is sized and matched to the filter to slidably receive the filter therein, with a usual perimeter clearance of ½ to ¾ inches, producing a space around the perimeter of a centered filter of ¼ to ⅜ inch. The filter is fit within the holder side structure with the case border portion seated on a holder flange projecting inwardly from the inner side of the bottom of the holder wall structure. When in service, the filter is lightly pressed against the flange by the resistance to air flow through the air filter element unless there is a reverse flow through the filter.

Leakage of air flow around the border of the air filter is sometimes attempted to be minimized by retainer arrangements urging the air filter against the holder flange, and a gasket mounted to either the air filter border or the holder flange is also sometimes included.

As noted, resistance to air flow through the pleated air filter element creates a force which normally at least lightly urges the air filter border against the holder flange, but installation where flow is in reverse direction would have the opposite result and increases the need to separately generate sealing pressure to maintain the filter firmly against the holder flange.

The air flow also tends to distort the filter by bulging the same, which is resisted by the filter casing which usually includes a cover sheet on each side with a pattern of flow openings in the cover sheets allowing air flow through the cover sheets.

These distorting forces may increase leakage around the border of the filter casing.

Separate stiff wire cross pieces are sometimes installed extending across the filter element to enable the filter to resist these distorting forces.

It is desirable that the air filter casing border be pressed against the holder flange to prevent significant volumes of unfiltered air flow from passing around the edges of the filter border, as such unfiltered flow could seriously degrade the performance of the filter. This becomes more acute where a reverse air flow is being filtered as mentioned above which creates forces tending to lift the filter casing out of engagement with the gasket or holder flange.

Furthermore, it is a delicate task to provide an arrangement for applying a sealing force against the typical lightweight filter casing particularly when the filter casing outer portions are relatively weak as when constructed of thin paperboard, since the filter border may be deformed significantly by the application of force to the border and allow bypass flow around the filter.

Accordingly, various arrangements have been used to urge the filter against the holder flange, but these have typically not generated an adequate sealing force urging the same against the gasket, due in some instances to the need to avoid excessively deforming the filter casing.

Air filters vary considerably in size and shape and have substantial differences in the sturdiness of the border portion of the filter case, and it is important to have a capability of varying the sealing forces so as to be practical for the sturdiness of a particular filter border.

Such attachments and retainer arrangements have typically involved the use of small removable hardware parts which are tricky to install and which can easily be separated from the holder and lost.

More importantly, adequate increases in sealing pressure typically have not yet been achieved by those arrangements.

It is also quite desirable that any such arrangement not require complicated or numerous steps to install or remove the filters, as this could become a maintenance burden, particularly for multiple filter installations.

Accordingly, it is an object of the present invention to provide a filter retainer arrangement which is capable of safely applying moderate but effective levels of sealing forces to a filter border without damaging the filter, but can also be conveniently increased when used with sturdier filter casings.

It is a further object of the invention to provide an easily installed filter retainer arrangement which does not involve the use of small, detachable hardware components which are apt to be lost.

Since many different sizes and configurations and operating conditions of filter installations may be encountered in the field, it is a further object of the invention to provide a filter retainer arrangement which can be easily adapted to variously configured and sized filters.

SUMMARY OF THE INVENTION

The above recited objects as well as other objects which will be appreciated by those skilled in the art are achieved by a retainer arrangement for a generally planar filter received in a filter holder, the filter having opposite sides and a self supporting border extending around a perimeter of said filter. The holder has a side wall structure defining a recess matched to the filter to allow the filter to be received therein with one side thereof positioned against a holder flange affixed relative said holder wall structure, with a small clearance space between the holder wall structure and the filter perimeter.

At least one non-stretchable retainer cable is affixed at opposite ends to the holder side wall structure at a location intermediate the thickness of the filter received therein.

The one or more retainer cables are of a length allowing a portion thereof to be drawn out of the clearance space, extended around an edge of the filter case border and over an opposite side of said filter.

An elastic stretchable tensioner cord is engaged at one end with a retainer cable mid portion which extends over and along the opposite side of the filter. The stretch cord is of a length so as to be tensioned when engaged with the retainer cable portion to thereby put the retainer cable in itself whereby the retainer cable is itself tensioned. Since the retainer cable is under tension and extends around the edge of the border in contact therewith, it exerts a reaction force on the point of contact, urging the filter one side against the holder flange.

Preferably, a pair of retainer cables are provided extending along respective sides of the filter, and both are of a length somewhat longer than the distance between the respective points of attachment of the ends of each retainer cable so that each retainer cable is able to be pulled up and out of the clearance space, passed around the edge of the filter casing border and over and along the other side of the filter a short distance away from the holder outer side thereof.

Both cables are simultaneously placed in tension by attachment thereto of an elastic stretchable tensioner cord, movably attached at each end, to a respective one of the retainer cables, and, of a length necessitating it to be stretched in order to be able to be hooked at the other end to the opposite retainer cable intermediate the length thereof at a point. That is, the stretch cord is of a length which requires some degree of stretching to be installed to the retainer cable to insure that both of the retainer cables are also in tension.

A sealing force acting to urge the filter against the holder flange is created by a reaction forces generated by the tensioner retainer cables in changing direction by being wrapped around the edge of the filter border when tensioned by the stretch cord. The tensioning of the retainer cables by the stretchable tensioner cord creates reaction forces which is applied to the areas of contact of the retainer cables in passing around the edge.

These reaction forces each include a component urging the filter against the holder flange acting at each of the four corners of the filter. The degree of these sealing forces can be varied by varying the tension level exerted by the stretch cord as by shortening or lengthening its length.

Again, the total sealing force is created by the force created by the tensioning of the retainer cables at each corner of the filter when wrapped around an edge of the air filter casing border, the force exerted acting normal to the plane of the filter to push the same against the holder flange.

The retainer cables are not substantially stretchable and may advantageously be constructed of twisted stainless steel wires preferably enclosed in a tubular casing which is easily flattened so as to increase the area on which the pressure is imposed on the filter casing border as each of the retainer cables pass around an edge of the filter casing border.

A series of retainer cable end attachment features such as holes in the holder wall structure can be provided so as to insure that the cable ends are located below the outside surface of a particular filter and thus insure that adequate sealing pressure on the filter casing is achieved.

As noted, the length and resiliency of the stretchable tensioner cord determines the magnitude of the sealing forces imposed by the retainer cables on the filter casing, and thus an adjustable length stretch cable can be provided to be adapted to differing sealing pressure requirements.

The retainer cables can advantageously have an eye fitting at each end received over threaded posts installed at each corner of the holder wall structure.

By attaching the retainer cables to the holder wall structure side member along which the retainer cables extend, the retainer cables may extend at an angle to the casing border so as to engage over a longer distance to reduce the average contact pressure on casings having a border which is less sturdy. With the points of attachment on the connecting holder side members, a direct crossing of the border will result, increasing the pressure able to be applied for sturdier filter casing borders.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
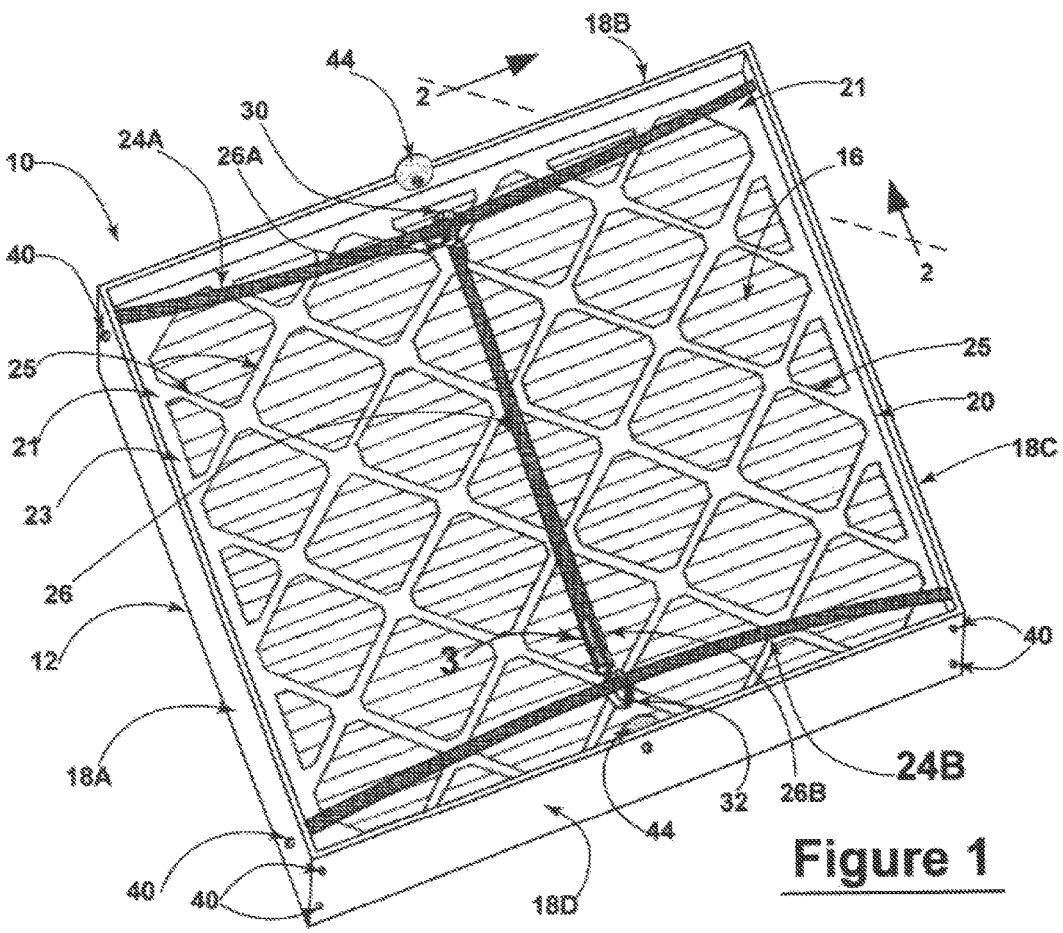
FIG. 1 is a pictorial view of a filter installed in a holder with components of a retainer arrangement according to the present invention.

Referring to FIG. 1 a conventional air filter installation 10 is depicted such as is used to filter air in building HVAC systems. A rectangular holder 12, typically made of sheet metal, has a wall structure comprised of four side members 18A, B, C and D connected together at their ends. A generally planar rectangular replaceable filter 20 is received into the frame like structure of the holder 12.

Figure 2:
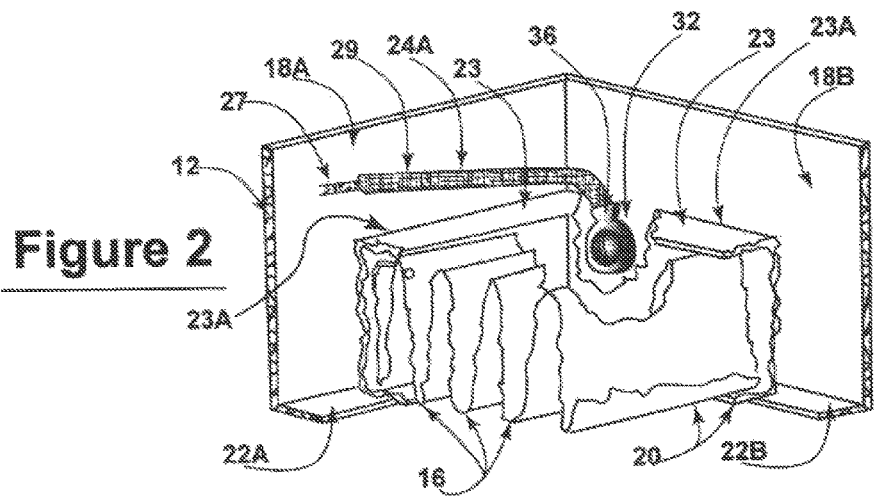
FIG. 2 is an enlarged pictorial view of a section taken across a corner of the holder along the line 2-2 in FIG. 1.
Figure 3:
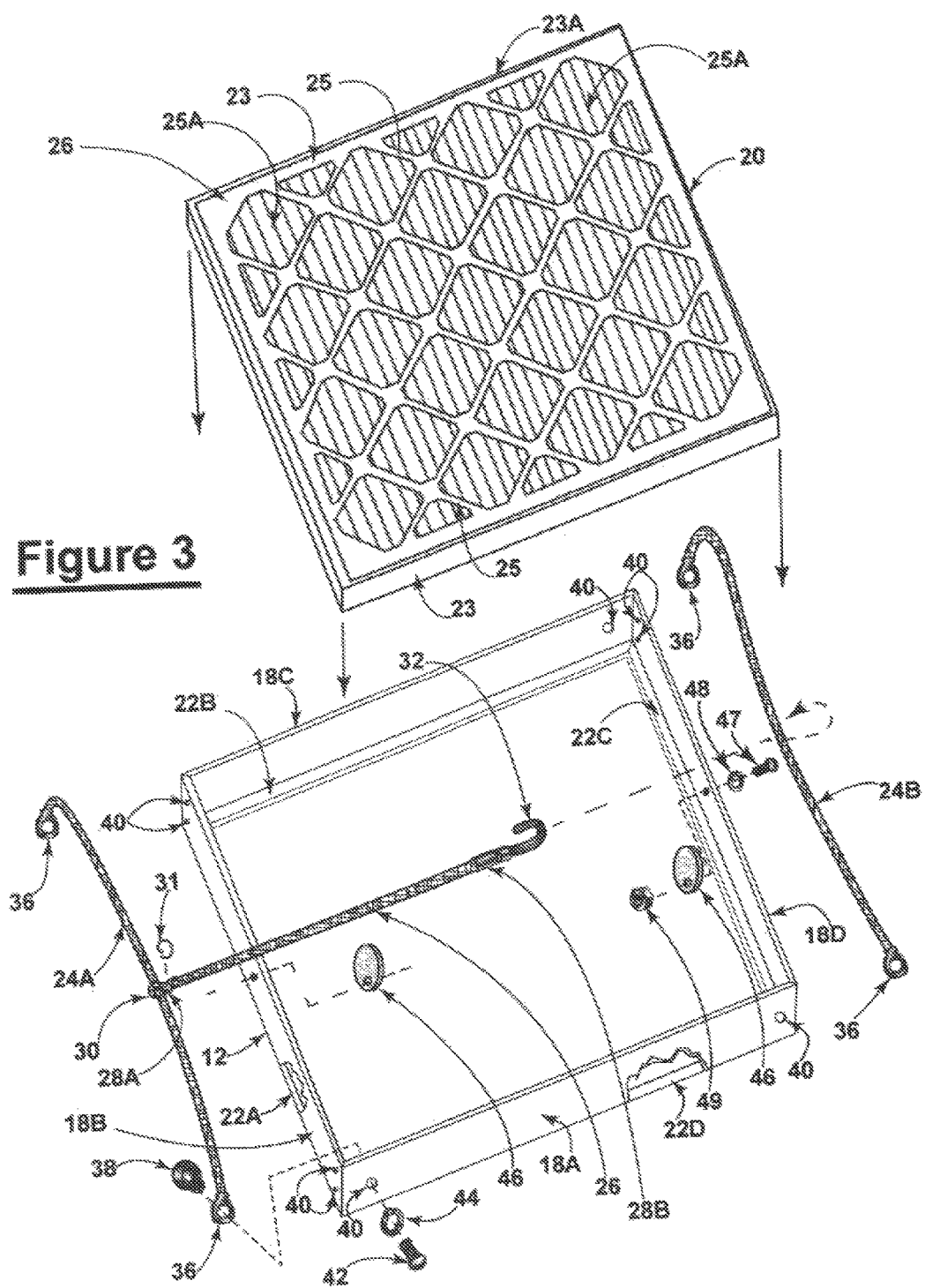
FIG. 3 is an exploded pictorial view of a filter together with a holder therefore and the retainer arrangement components as shown in FIG. 1 but in a rotated position.

As seen in FIGS. 2 and 3, the holder 12 also has four flanges 22A, B, C, D extending from the lower side of the side members 18A, B, C and D that form a rectangular support against which one side of the air filter 20 is placed.

Such filters 20 typically include a filtering element 16 comprised of a sheet of pleated paper or other filtering material, held in a thin cardboard or plastic filter casing 21 of a U-shaped configuration receiving the perimeter of the filter 20. The filter 20 is received in the holder 12 with the border 23 seated on the holder flanges 22A, B, C, D (FIGS. 2, 3).

A network of crossing strips 25 on each side of the filter 20 restrain the pleated air filter element 16 and maintain the filter 20 in a substantially planar configuration while forming holes 25A as for the passage of air therethrough.

The retainer reinforcement arrangement according to the invention preferably includes a pair of retainer cables 24A, 24B which are substantially not stretchable and are each attached at either end to respective opposite sides 28A of the holder 12. The retainer cables 24A, 24B may be comprised of twisted together lengths of stainless steel wire 27 encased in an easily deformable plastic tube 29 (FIG. 2), which serves to increase the diameter of the retainer cables 24A, 24B so as to reduce the magnitude of the contact pressure imposed on the filter casing border 23 as described below with the outer edges of the filter element 16 received within the border 23 of the casing 21 as best seen in FIG. 2.

The tubing 29 acts to distribute the pressure exerted on the filter casing border 23 when the retainer cables 24A, 24B are placed in tension and wrapped around the edge of the air filter 20 engaging the casing border 23 as described.

Each retainer cable 24A, 24B extends along a respective one of opposite pairs of side wall members, either 18B, 18D, as seen in FIG. 1, or 18A, 18C, attached at either end of the holder 12.

Each of the attachment points must be located below the surface of the outer side of the filter 20 in which air flow enters the filter 20 as seen in FIG. 2, so that each end of each retainer cable 24A, 24B is wrapped around the edge 23A of the filter casing border 23 to be extended over the outer surface of the filter 20 in a direction along the opposite holder side 18B, 18D (FIG. 1) or alternatively 18A, 18C not shown.

An elastically stretchable tensioning cord 26 is attached at either end to a respective retainer cable 24A, 24B at a point intermediate the length of the retainer cables 24A, 24B, i.e., at the approximate middle thereof.

For a single retainer cable, the tensioning cord 26 would simply be anchored to the holder 12 (not shown).

One end 26A of the tensioner cable 26 is permanently but movably connected to one of the retainer cables 24A and 24B by an end loop 30 as which is slidable along the length of the retainer cable 24A. The other end 28B has a hook fitting 32 attached to allow the end 28B of the tensioner cord 26 to be hooked to the other retainer cable 24V after the filter 20 is installed in the holder 12.

The length of the elastically stretchable tensioner cord 26 is set to require stretching to a degree sufficient to pull the midpoints of the retainer cables 24A, 24B towards each other and to be held in tension to a degree developing the desired pressing force level acting on the filter 20 in each corner thereof.

As seen in FIG. 2 showing retainer cable 24A, each retainer cable 24A, 24B rounds an edge 23A of the filter casing border 23 and is tensioned by the hook connection 32 to the tensioner cord 26, causing a reaction force to be developed, acting on the filter 20, tending to force the filter casing border 23 against the holder flanges 18A, B, C, D to thereby generate a sealing pressure acting around the perimeter of the casing border 23 of the filter 20.

The retainer cables 24A, 24B each may be attached to the inside of a holder side wall 18A, B, C, D by use of respective eye fittings 36 permanently attached to ends of each cable 24A, 24B.

Screw posts 38 each receive an eye fitting 36 and passes through a selected one of several holes 40 in the sidewalls 18A, 18B, 18C, 18D adjacent at each of the corners of the holder 12 with a screw 42 and lock washer 44 fixing each of the screw posts 38 to the inside of a holder side wall (FIG. 3) all of the holes 40 are not shown in the drawing Figures.

This creates a compact point of attachment easily accommodated by the normal clearance spaces between the holder sidewalls 18A, B, C, D and the border 23 of the filter casing 23.

As noted, the points of attachment must be located intermediate the thickness of the filter 20 so that a plurality of holes 40 each at an appropriate level allow different thicknesses of the filter 20 to be accommodated.

As seen in FIGS. 1 and 3, the holes 40 are provided on either side of the corners of the holder 12. If the attachment is to a holder 18B and 18D along which the retainer cables extend, using holes 40 the retainer cable 24A, 24B will cross over the filter case border edges 23A at an angle to distribute the pressure of engagement therewith over a greater distance compared to a direct crossing which results if the attachment holes 40 on the connecting sides 18A, and C are used.

Thus, sturdier filters can allow installation where the retainer cables 24A, 24B directly cross the air filter casing border 23 using holes 40 in holder sides 18A, 18C and less sturdy air filters may require use of holes 40' on the same holder sides 18B, 18D (FIG. 1) along which the cable 24A, 24B extend.

Stowing discs 46 (FIG. 3) may each be attached with a screw 47, washer 48 and nut 49 to the opposite holder sides 18A, B, C, D along which the retainer cables 24A, 24B extend so as to stow the retainer cables 24A, 24B out of the way when the stretched tensioner cord 26 is released to keep the same out of the way when changing the filter 20.

Figure 4:
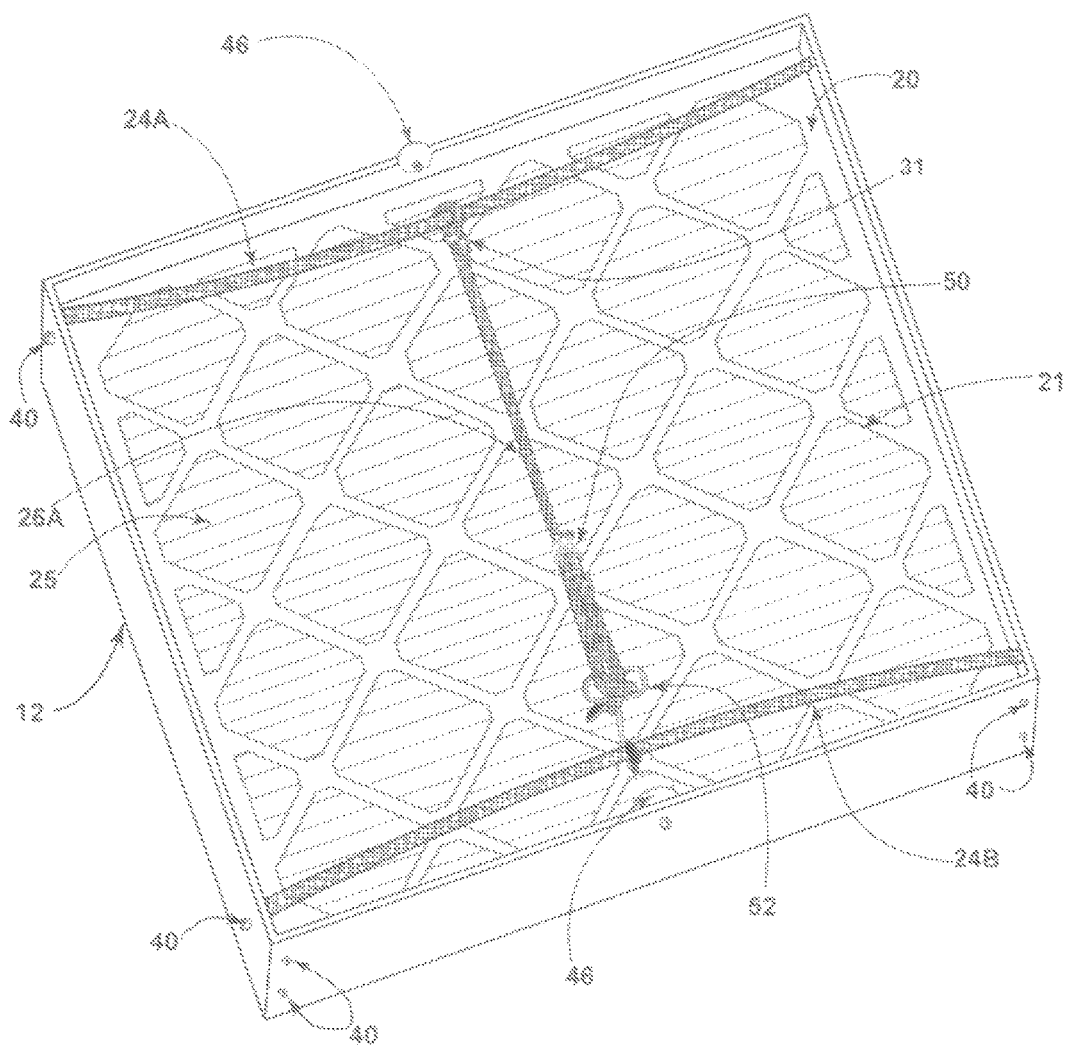
FIG. 4 is an enlarged pictorial view of a filter installed in a holder with retainer arrangement components including an adjustable length stretchable tensioner cord.

FIG. 4 shows an adjustable length stretch tensioner cord 26A where excess lengths thereof can be held by a retainer ring 50 and adjusting length fittings 52 secures the adjustment made. This allows convenient adjustment to achieve a desired tension level of the retainer cables 24A, 24B.

It is noted that the retainer cables 24A, 24B also help in resisting bulging of the air filter 20.

The invention may be used on filters for other gases as well as specifically for air as mentioned above.

The invention claimed is:

1. A retainer arrangement comprising a holder combined with a replacement filter for increasing the sealing pressure of the replaceable filter installed in the holder so as to have a perimeter of one side of the filter through which air or other gas flow occurs held against a flange of said holder, said retainer arrangement including a pair of flexible but not substantially stretchable retainer cables, each retainer cable connected at either end adjacent to a respective one of sides of said holder at points of attachment on one of said holder sides so that each cable is capable of being extended along a respective one of said holder sides thereof, said points of attachment to said holder sides located at a level above said holder flange but within a thickness of said filter, said retainer cables each being longer than a distance between said points of attachment to said holder sides so that said cables are able to be drawn up and around and in contact with an outer edge of an opposite side of said filter within a clearance space between said filter and said holder and onto said opposite side of said filter; and, a stretchable tensioner cord attached at opposite ends thereof to a respective one of said retainer cables and extending over said opposite side of said filter along respective sides of said holder, said stretchable tensioner cord being sufficiently short and resiliently stretchable to pull unattached portions of said retainer cables towards each other to establish a tensioning of said retainer cables whereby said retainer cables each exert a force on said filter at each point where said retain retainer cable passes around and in contact with a respective side edge of said filter pushing said filter against said flange of said holder to thereby increase the sealing pressure exerted by said filter on said flange.

2. The retainer arrangement according to claim 1 wherein a series of holes is provided adjacent each corner of said holder arranged along the depth of said holder sides, and each of said retainer cables ends are attached to anchors which are installed in any one of said holes to enable location of said retainer cable ends at a selected location within said holder at said points of attachment within said thickness of said filter.

3. The retainer arrangement according to claim 1 wherein said stretchable tensioner cord is adjustable in length to be accommodated to different sizes of said filter.

4. The retainer arrangement according to claim 1 wherein said filter comprises a pleated filter element contained within a filter case having flow openings therein overlying each side of said filter element, said case having an outer border portion defining said outer edge of said filter.

5. The retainer arrangement according to claim 1 wherein each of said retainer cables is disposed within a tubular outer jacket to increase the diameter thereof and thereby decrease pressure exerted on said outer edges of said filter.

6. The retainer arrangement according to claim 1 further including an elevated stowage feature on opposite sides of said holder enabling keeping of said retainer cables out away from said filter when said stretchable tensioner cord is disconnected from one of said retainer cables to facilitate removal of said filter.

7. A retainer arrangement comprising a generally planar filter received in a filter holder, the filter having opposite sides and a self supporting border extending around a perimeter of said filter, said holder having a side wall structure defining a recess matched to the filter perimeter to allow said filter to be received therein with one side thereof positioned against a holder flange affixed relative said holder wall structure, with a clearance space between the holder wall structure and the filter perimeter;
  at least one substantially non-stretchable retainer cable is affixed at opposite ends to the holder side wall structure at a location intermediate a thickness of the filter received therein;
  the at least one retainer cable is of a length allowing a portion thereof to be drawn out of the clearance space extending around the border and onto an opposite side of said filter opposite said one side; and
  an elastic stretchable tensioner cord engaged at one end with the retainer cable portion extending over the opposite side of said filter, and anchored at an opposite end, said stretchable tensioner cord is of a length so as to be tensioned when engaged with said retainer cable portion to thereby put said retainer cable in tension whereby said retainer cable is tensioned and extending around said border in contact therewith to exert a reaction force thereon urging said filter one side against said holder flange.

8. A method of increasing the pressure exerted by a generally planar filter against a flange of a filter holder on which the filter is seated, the filter having opposite sides and a self supporting border extending around a perimeter of said filter, said holder further having a side wall structure defining a recess matched to the filter perimeter to allow said filter to be received therein with one side thereof positioned against a said holder flange affixed relative said holder wall structure, with a clearance space between the holder wall structure and the filter perimeter, said method comprising;
  installing at least one non-stretchable retainer cable to be affixed at opposite ends to said holder side wall structure at a location intermediate a thickness of the filter received therein,
  said at least one retainer cable of a length allowing a portion thereof to be drawn out of the clearance space and extended around an edge of the border and onto an opposite side of said filter; and
  engaging one end of an elastically stretchable tensioner cord with the portion extending over the opposite side of said filter, and anchoring a tensioner cord opposite end, said stretchable tensioner cord set to be a length so as to be tensioned when engaged with said retainer cable portion thereby also putting said retainer cable in tension, and extending said retainer cable around the edge of said border so as to contact the border and to thereby create a reaction force urging said filter one side against said holder flange.

* * * * *